Patented Apr. 7, 1936

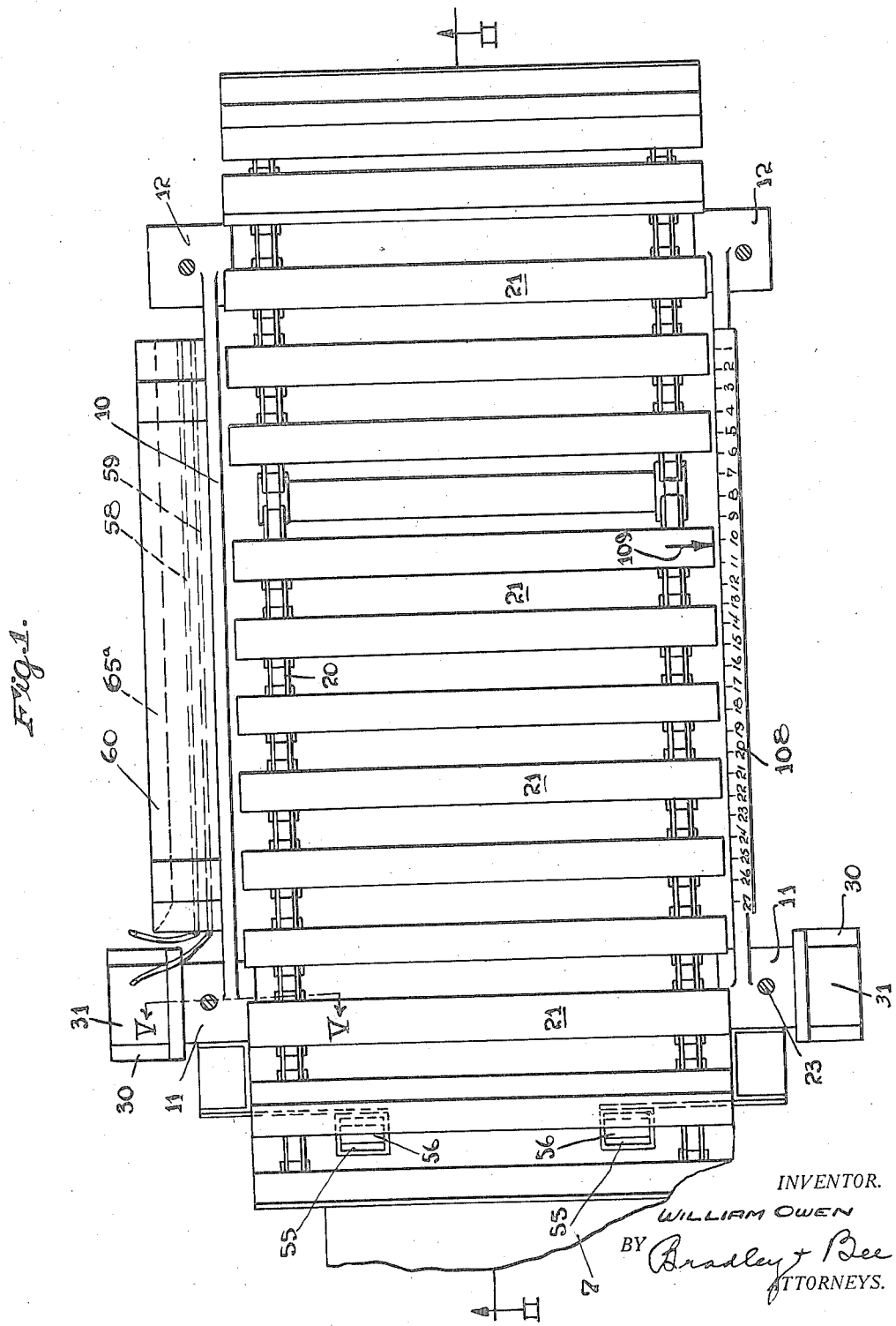

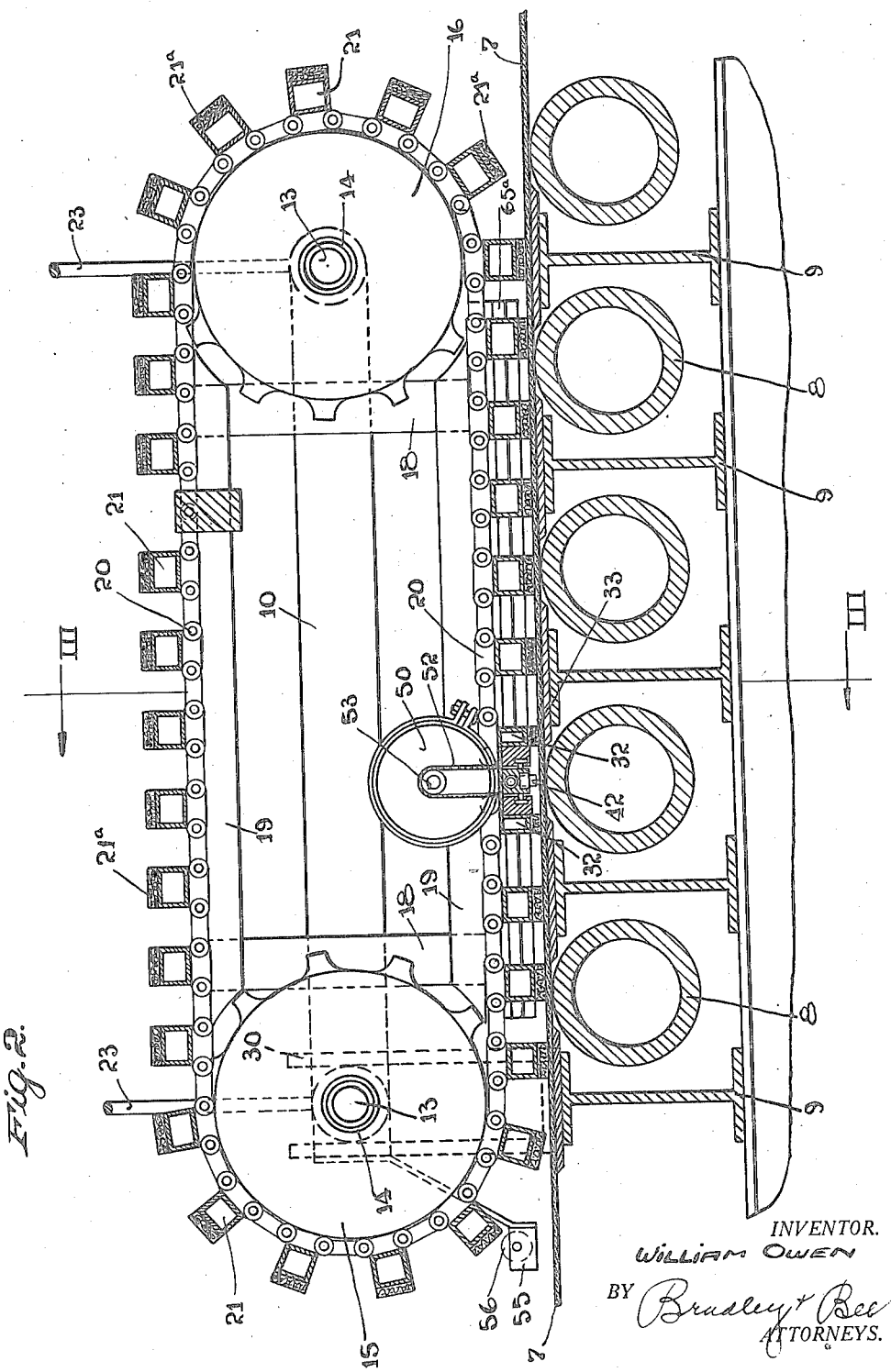

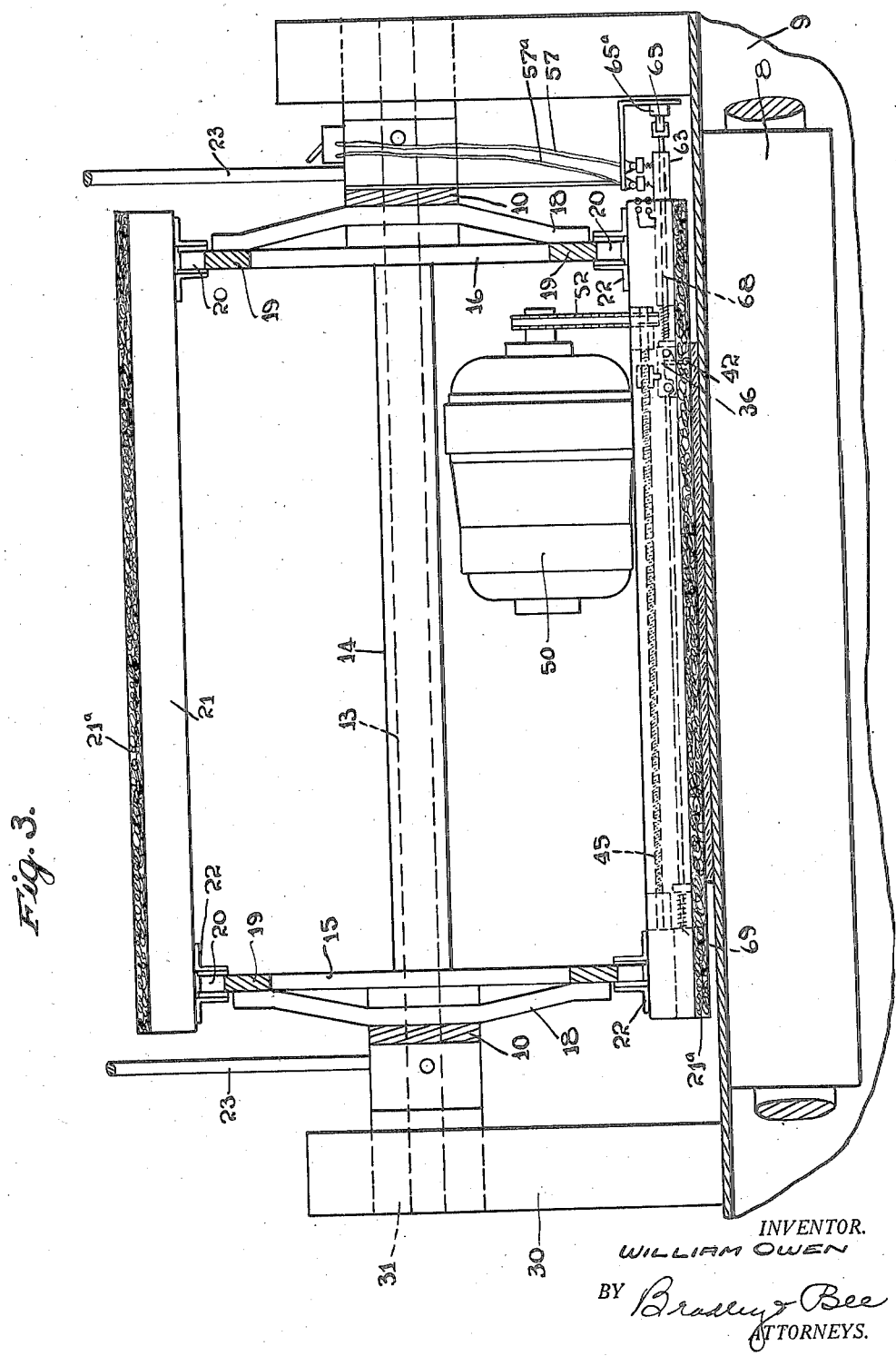

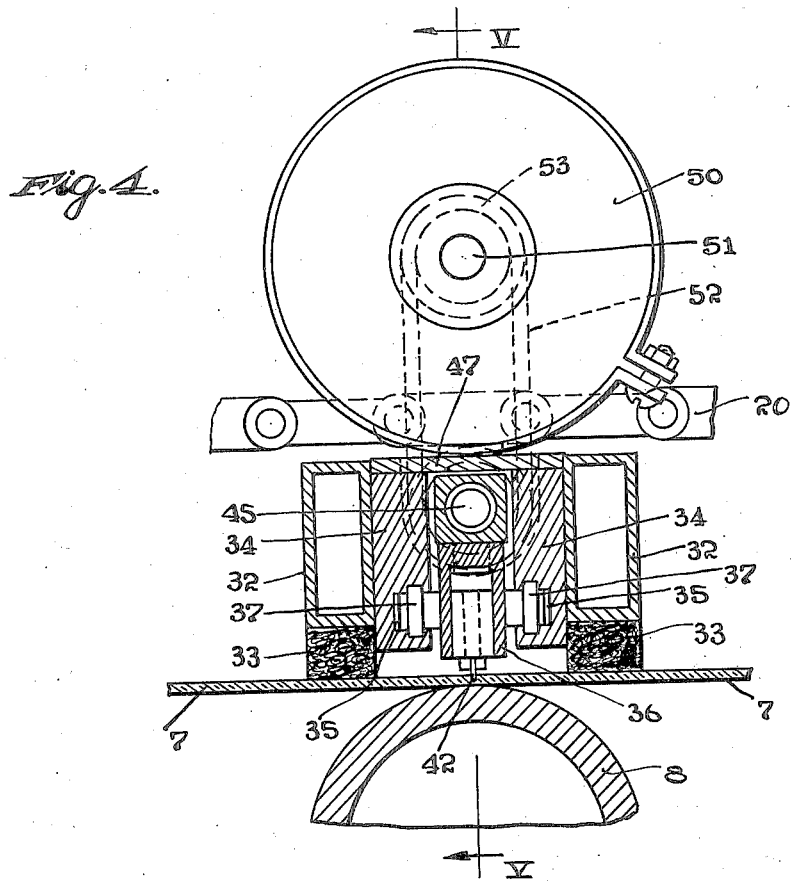
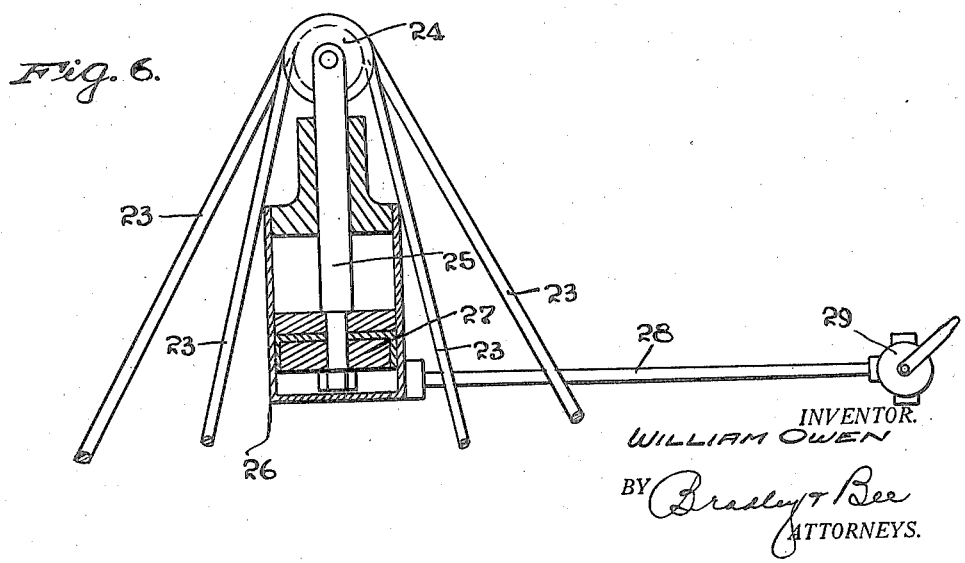

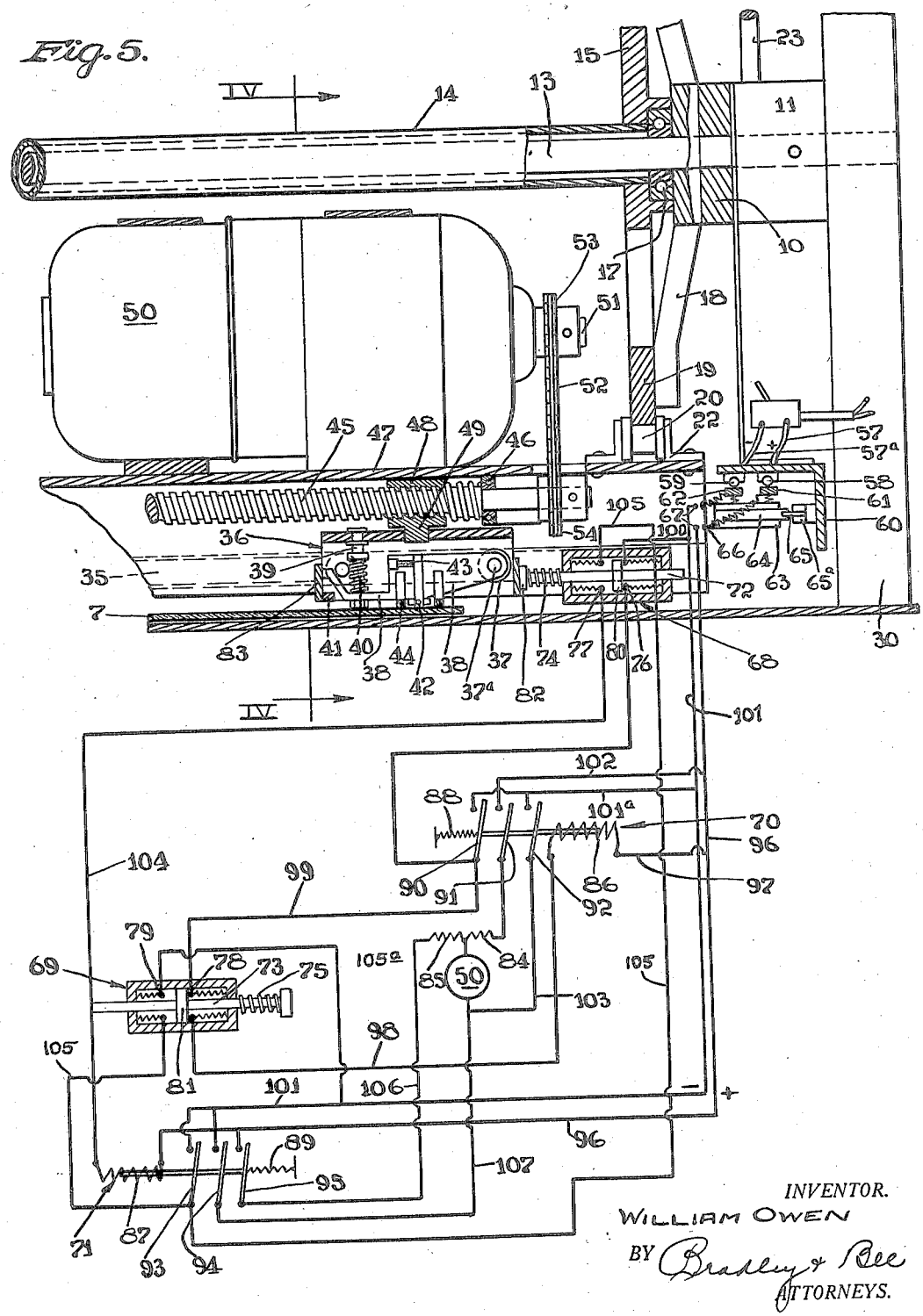

2,036,294

UNITED STATES PATENT OFFICE 2,036,294

GLASS CUTTING APPARATUS

William Owen, Pittsburgh, Pa., assignor to Pittsburgh Plate Glass Company, Allegheny County, Pa., a corporation of Pennsylvania Application July 26, 1935, Serial No. 33,197

6 Claims. (Cl. 33—32)

The invention relates to apparatus for cutting glass, such as plate or window glass, into sections of uniform length as the glass emerges in a sheet from a horizontal annealing leer and travels along a runway. It has for its objects the provision of an improved apparatus which operates automatically to cut the sheet while it moves along the runway; which is reliable and positive in operation; and which is removably supported from above so that it may be readily applied and removed from the runway to meet requirements of service. A further object is the provision of a construction which is adaptable to the cutting of strips of odd length from the sheet to remove defective portions thereof when the occasion arises.

Briefly stated, the apparatus comprises a caterpillar or endless belt which rests on the glass sheet, and whose lower flight is moved by the glass and carries a bridge extending transversely of the sheet on which is mounted a motor operated carriage provided with a cutter, the belt constituting the caterpillar preferably being of a length which is just equal to the length of the sheet sections to be cut so that one cut is made for each cycle of travel of the belt. The movement of the motor operated cutter is controlled by means of suitable switches so that a cut is made both on the forward and return movement of the carriage in which the cutter is mounted. The caterpillar is preferably mounted on an overhead support provided with raising and lowering means, so that it may be moved to inoperative position by simply lifting it from the runway. This permits the cutting of sections from the glass sheet of odd length when occasion arises, such as in removing a relatively short strip of glass having a defect therein. One embodiment of the invention is illustrated in the accompanying drawings, wherein:

Figure 1 is a plan view. Fig. 2 is a section on the line II—II of Fig. 1. Fig. 3 is a section on the line III—III of Fig. 2. Figs. 4 and 5 are enlarged detail sections, Fig. 4 being taken on the line IV—IV of Fig. 5, and Fig. 5 being taken in part on the line V—V of Fig. 4, and in part on the line V—V of Fig. 1, and also including a diagrammatic showing with the wiring diagram. And Fig. 6 is a fragmentary vertical section showing the means for lifting the caterpillar.

Referring to the drawings, 7 is the glass sheet to be cut which emerges from a leer (not shown) and moves to the right (Fig. 2) over a runway consisting of the driven rolls 8, 8, 8, etc. interspersed with the I-beams 9, 9, 9, etc. carried by the framework of the runway. Mounted removably above the runway is the cutting apparatus in the form of an endless belt or caterpillar, whose lower flight rests upon the surface of the glass and moves to the right therewith. This construction comprises a frame made up of the side bars 10, 10 having at their ends the blocks 11, 11 and 12, 12 tied together by the rods 13, 13. Mounted around the tie rods are a pair of hollow sprocket shafts 14, 14, to whose ends are welded the pairs of sprocket discs 15, 15 and 16, 16. Roller bearings 17 are provided between the hubs of the sprocket discs and suitable collars on the tie rods 13, as indicated in Fig. 5. Secured to the side bars 10, 10 by means of the brackets 18, 18 (Fig. 2) are the chain bars 19, 19 on which ride the sprocket chains 20, 20, constituting the endless belt. These sprocket chains ride over the sprockets 15, 16 and are tied together by means of a series of transverse slats or bars 21 of rectangular cross section having pads 21a of felt or the like on their outer faces. These bars are secured to the chain links by riveting them to ears 22 (Fig. 3) carried by alternate links of the chain.

The apparatus is moved up and down when occasion requires by means of four lifting rods 23 which are secured to the blocks 11 and 12 and extend up over a sheave 24, as indicated in Fig. 6. This sheave is carried by the upper end of the piston rod 25, mounted for vertical movement in the air cylinder 26. A plunger 27 is provided at the lower end of the piston rod 25 and air is supplied for raising and lowering the plunger through the pipe 28 controlled by the three-way valve 29. The air cylinder 26 is mounted upon a suitable fixed support (not shown) located above the central portion of the caterpillar, so that the admission and exhaust of air at the lower end of the cylinder, raises and lowers the caterpillar. When in lowered position, the lower flight of the endless belt rests upon the glass sheet 7 and moves therewith at the same speed. When for any reason it is desired to discontinue the operation, the caterpillar is raised by the cylinder, thus disengaging its lower flight from the glass sheet. The air cylinder may be carried by a fixed support on the superstructure above the runway, or it may be mounted upon a crane, which latter arrangement facilitates the convenient movement of the cutting apparatus to and from its position of use.

The lifting cylinder also comes into play, as later described, when it becomes necessary to cut a strip of glass of odd length from the glass sheet in order to remove a defect. In the normal operation of the apparatus, one cut is made for each complete cycle of movement of the endless belt, which means that such belt has a length equal to the sections which are cut from the glass sheet. For example, if the glass sheet is six feet in width, a desirable length of section is about 11 feet. In order to guide the frame in its vertical movements, so that it will not change its position longitudinally of the runway, a pair of U-shaped guide members 30, 30 are mounted upon the framework of the runway, as indicated in Figs. 1 and 2 and engage the extensions 31, 31 at the ends of the blocks 11, 11.

The cutting mechanism which is carried by the endless belt, is supported upon a pair of transverse bars or slats 32, 32 (Figs. 4 and 5) carrying felt pads 33, 33 on their outer faces, and are similar in construction to the bars or slats 21, except that their cross section is slightly different. These slats or bars 32, 32 are fastened to the chain lengths in the same manner as the bars 21. Secured to these slats intermediate the same is a bridge for the cutter carriage consisting of the bars 34 with a space therebetween for the carriage and also provided with a pair of slots 35, 35 for the wheels of the carriage. The carriage comprises a U-shaped frame 36 opening downwardly (Fig. 5) and provided on its sides with four wheels 37 which ride in the slots 35, 35. Pivotally mounted at 37a (Fig. 5) in this frame is an arm 38, such arm being guided upon a bolt 39 and yieldingly pressed downward by a spring 40. A stop 41 mounted upon the cutter carriage limits the downward movement of the arm. The arm carries a suitable cutter 42, whose position longitudinally of the arm is adjusted by means of a screw 43. On each side of this cutter also carried by the arm is a pair of wiping felts 44, whose function is to apply kerosene or other cutting fluid to the glass during the cutting operation.

The movement of the cutter carriage is accomplished by means of a screw 45 swiveled at its end in bearings 46 carried by a plate 47 which is attached to the upper sides of the bridge members 34, 34. This screw carries a nut 48 provided with a lug 49 engaging the U-shaped frame of the carriage 36 (Fig. 5). The rotation of the screw thus serves to move the cutter carriage back and forth along the bridge. The rotation of the screw is accomplished by means of an electric motor 50 supported upon the plate 47 and having a drive shaft 51. A sprocket chain 52 extends around suitable sprockets 53 and 54 on the ends of the drive shaft and screw respectively. In order to wet the felts 44 on each side of the endless belt, pans 55 are provided (Figs. 1 and 2) carrying kerosene and the like and provided with soft rolls 56 dipping into the kerosene. These rolls are so positioned that the felts are engaged thereby during the travel of the belt.

The apparatus for giving automatic control to the operation of the cutter carriage will be seen by reference to Figs. 1, 3 and 5, particularly Fig. 5, which shows the wiring diagram. Current is supplied from the leads 57 and 57a, which are connected to a pair of trolley wires 58 and 59 carried by the underside of the guard 60. Contact is made to these wires during the cutting operation by means of a pair of spring pressed shoes or brushes 61 and 62 mounted upon a bracket 63 which is secured to the end of the bridge in which the cutter carriage rides. This bracket is provided with a plunger rod 64 yieldingly pressed to the right (Fig. 5) and carrying a roller 65 at its end. This roller is adapted to engage a cam 65a carried by the guard 60 during the cutting period as will be seen by reference to Figs. 1 and 5. The inner end of the rod 64 carries a pair of contacts 66 which are adapted to engage the pair of contacts 67, also carried by the bridge, when the rod 64 is moved to the left by the cam 65a. For the period in which the roller 65 is engaged by the cam 65a, current is supplied to operate the motor 50 controlling the cutter carriage, and during the remainder of the travel of the cutter bridge, the contacts 66 and 67 are separated, so that no current is supplied to the motor. The movements of the cutter carriage are controlled by a pair of trip switches 68 and 69 and by the relays 70 and 71.

The trip switches 68 and 69 are similar in construction. They comprise the rods 72 and 73 normally held in their forward positions by means of the springs 74 and 75 and the pairs of contacts 76, 77, 78 and 79 adapted to be engaged by the collars 80 and 81, which act as switch arms. The trip switches are carried by the cutter bridge, and their rods are so positioned as to be engaged by the plates 82 and 83 mounted on the cutter carriage when the carriage reaches the end of its travel, thus completing the cut. The engagement of the cutter carriage with the rod 72 is shown in Fig. 5, while the position of the parts of the trip switch 69 whose rod is not engaged by the carriage is also shown in this figure.

The motor 50 is of the split field type having the field sections 84 and 85, so that when current is passed through one section, the motor rotates in one direction, and when current passes through the other section, the motor rotates in the reverse direction. The direction of rotation of the motor is controlled by the relays 70 and 71 which have the operating coils 86 and 87 for moving the switches to closed position, such switches being normally held in open position by means of the springs 88 and 89. The switches controlled by the relays each include the three arms 90 and 91, 92 and 93, and 94 and 95.

The parts are shown in Fig. 5 in the position occupied after the cutter carriage has moved to its extreme right hand position, thus completing the scoring of the sheet and the roller 65 has passed off of the right hand end of the cam 65a. At this time, the contacts 66 and 67 are separated so that no current flows to the wiring system and the motor is thus stopped leaving the cutter carriage in the position shown in Fig. 5. This condition continues until the cutter bridge makes the circuit of the sprockets 16 and 15 and arrives at a position a little to the left of that shown in Fig. 2, at which time the roller 65 on the rod 64 engages the left hand end of the cam 65a, which engagement causes the rod 64 to move to the left and brings the contacts 66 into engagement with the contacts 67, so that current is now supplied to the wiring system. The first result produced is the operation of the relay 70 incident to a flow of current through the coil 86. The flow of current to thus energize the coil 86 includes the wires 96, 97 and 98, the contacts 78, the wire 99, the contacts 76 and the wire 100. The closing of the relay admits a supply of current through the motor. The circuit thus provided includes the wires 96 and 102, the switch arm 91, the motor field winding 84, the wire 103, the switch arm 92, and the wires 101a and 101. The cutter carriage now moves to the left from the position shown in Fig. 5, making the next cut across the glass sheet. This movement to the left permits the rod 72 of the trip switch 68 to move to the left, breaking the connection between the contacts 76, and making connection between the contacts 77. The circuit through the coil 86 is still maintained, however, because of the relay holding arm 90, which is now closed, so that current from the wire 99 continues to flow back to the lead 57a via the wires 101a and 101.

The movement of the carriage to the left continues until the plate 83 on the carriage strikes the rod 73 of the trip switch 69, moving it to the left, interrupting the circuit between the contacts 78 and completing the circuit between the contacts 79. This interrupts the holding circuit of the relay coil 86 through the wires 98, 99, and 101 since the spring 88 now opens the arms of the relay switch, including the arm 90. The opening of the relay switch 86 also interrupts the flow of current through the motor, so that the movement of the motor and carriage is thus stopped. The further movement of the belt and bridge to the right (Figs. 1 and 2) carries the roll 65 off of the cam 65a, so that the rod 64 moves to the right again, interrupting the circuit between the contacts 66 and 67. This completes the cycle, the parts now being at positions similar to those illustrated in Fig. 5, except that (1) the cutter carriage is in its left hand position, (2) the rod 73 of the trip switch 69 occupies its position to the left instead of the position shown, and (3) the rod 72 of the trip switch 68 occupies its position to the left instead of the position shown.

The succeeding cycle of the operation involves merely a reversal of that already described. When the bridge again arrives at a position a little to the left of that shown in Fig. 2, the roller 65 is engaged by the cam 65a, and the circuit is energized due to the engagement of the contacts 66 and 67. At this time the coil 87 of the relay 71 is energized, the circuit thus completed comprising the wires 96 and 104, the contacts 77, the wire 105, the contacts 79 and the wires 105a and 101. This causes the relay to close, so that current is now supplied through the winding 85 of the motor, such circuit including the wire 96, the relay arm 95, the wire 106, the winding 85 and the motor, the wire 107, the relay arm 94 and the wire 101. The motor now rotates in the reverse direction, so that the cutter carriage is moved to the right, making another cut, and finally arriving at the position shown in Fig. 5. This movement causes the trip switches 68 and 69 to again assume the position shown in Fig. 5. During this movement of the motor, the circuit through the relay is interrupted due to the movement of the collar 81 away from the contact 79, but the supplemental circuit through the coil 87 is maintained incident to the use of the holding arm 93 of the relay 71, as heretofore described in connection with the relay 70. This brings the parts all back to the starting position shown in Fig. 5, at which time the relay circuit is interrupted due to the engagement of the carriage with the rod 72 of the switch 68, thus completing the full cycle of the machine.

It will be seen that one cut is made for each complete circuit of the belt and cutter bridge carried thereby, so that the length of the strips cut is equal to the length of the belt. In case it is desired to cut a strip of different length, as in removing a defect, this is accomplished by raising and lowering the caterpillar and making two cuts the desired distance apart, depending upon the time the caterpillar is maintained in raised position. In carrying out this operation, the scale 108 on the side bar 19, shown in Fig. 1, is employed, in connection with the pointer 109 carried upon one of the slats 21. When the pointer 109 is at 1 on the scale, the cycle is ready to start, and when the caterpillar is lifted off the glass the belt can be pushed back and forth to make varied lengths of cuts. In order to balance the weight of the cutter bridge and motor, a counterweight 110 (Fig. 2) is preferably employed upon the belt, such counterweight being of substantially the same weight as the motor and cutter bridge. This serves to equalize the strains imposed upon the supporting rods 23.

What I claim is:

1. The combination with means for carrying forward a horizontal ribbon of glass, of cutting off apparatus comprising an idler endless belt having a lower horizontal flight in parallel with the glass ribbon and adapted to rest upon the ribbon and move therewith, a cutter bridge carried by the belt and extending transversely thereof, a carriage provided with a cutter mounted on the bridge, and means for raising and lowering the belt.

2. The combination with means for carrying forward a horizontal ribbon of glass, of cutting off apparatus comprising an idler endless belt having a lower horizontal flight in parallel with the glass ribbon and adapted to rest upon the ribbon and move therewith, a cutter bridge carried by the belt and extending transversely thereof, a carriage provided with a cutter mounted on the bridge, a motor for moving the carriage back and forth along the bridge, and means for raising and lowering the belt.

3. In combination with means for carrying forward a horizontal ribbon of glass, of cutting off apparatus comprising a frame extending longitudinally of the glass ribbon and provided with a pulley at each end, an endless belt passing around the pulleys with its lower flight in parallel with the glass ribbon and adapted to rest on the ribbon and move therewith, means for raising and lowering the frame so that said lower flight of the belt may be engaged and disengaged from the ribbon, a cutter bridge carried by the belt and extending transversely thereof, a carriage provided with a cutter mounted on the bridge and a motor for moving the carriage back and forth along the bridge.

4. The combination with means for carrying forward a horizontal ribbon of glass, of cutting off apparatus comprising an idler endless belt having a lower horizontal flight in parallel with the glass ribbon and adapted to rest upon the ribbon and move therewith, a cutter bridge carried by the belt and extending transversely thereof, a carriage provided with a cutter mounted on the bridge, means for raising and lowering the belt, an electric motor for moving the carriage back and forth along the bridge, and a switch operated by the movement of the belt for controlling the supply of current to the motor.

5. The combination with means for carrying forward a horizontal ribbon of glass, of cutting off apparatus comprising an idler endless belt having a lower horizontal flight in parallel with the glass ribbon and adapted to rest upon the ribbon and move therewith, a cutter bridge carried by the belt and extending transversely thereof, a carriage provided with a cutter mounted on the bridge, means for raising and lowering the belt, an electric motor for moving the carriage back and forth along the bridge, a switch operated by the movement of the belt for controlling the supply of current to the motor, and limit switches at the ends of the bridge operated by the movement of the carriage for controlling the travel thereof.

6. The combination with means for carrying forward a horizontal ribbon of glass, of cutting off apparatus comprising an idler endless belt, whose length equals that of the sections to be cut from the ribbon, and having a lower horizontal flight in parallel with the glass ribbon adapted to rest on the ribbon and move therewith, a cutter bridge carried by the belt and extending transversely thereof, a carriage provided with a cutter mounted on the bridge, a motor for moving the carriage back and forth along the bridge, and automatic means controlling the operation of the motor whereby the carriage is caused to move along the bridge with the cutter in engagement with the glass on each circuit of the belt.

WILLIAM OWEN.